United States Patent
Lee

(10) Patent No.: US 9,191,629 B2
(45) Date of Patent: Nov. 17, 2015

(54) BABY MONITORING SYSTEM INCLUDING VIDEO ENHANCEMENT CAPABILITY OPERABLE AT VARIOUS FREQUENCIES

(71) Applicant: Simon Sung Lee, Carlsbad, CA (US)

(72) Inventor: Simon Sung Lee, Carlsbad, CA (US)

( * ) Notice: Subject to any disclaimer, the term of this patent is extended or adjusted under 35 U.S.C. 154(b) by 0 days.

(21) Appl. No.: 13/986,965

(22) Filed: Jun. 18, 2013

(65) Prior Publication Data
US 2013/0342693 A1 Dec. 26, 2013

Related U.S. Application Data

(60) Provisional application No. 61/690,207, filed on Jun. 20, 2012.

(51) Int. Cl.
*H04N 5/232* (2006.01)
*H04N 7/18* (2006.01)
*G08B 21/02* (2006.01)

(52) U.S. Cl.
CPC ............. *H04N 7/18* (2013.01); *G08B 21/0208* (2013.01); *H04N 5/23206* (2013.01)

(58) Field of Classification Search
CPC ........................ H04N 5/23206; H04N 5/232
USPC ............................. 348/211.99, 211.4, 211.8
See application file for complete search history.

(56) References Cited

U.S. PATENT DOCUMENTS

| | | | |
|---|---|---|---|
| 7,570,810 B2 | 8/2009 | Rai et al. | 382/167 |
| 7,603,080 B2 | 10/2009 | Richenstein et al. | 455/3.06 |
| 7,822,387 B2 | 10/2010 | Gross | 455/67.11 |
| 7,906,891 B2 | 3/2011 | Jendbro et al. | 310/800 |
| 7,973,665 B2 * | 7/2011 | Desrosiers | 340/573.1 |
| 8,000,652 B2 | 8/2011 | Wihlborg | 455/39 |
| 8,116,889 B2 | 2/2012 | Krzyzanowski et al. | 700/90 |
| 8,135,388 B1 | 3/2012 | Gailloux et al. | 455/412.1 |
| 8,175,539 B2 | 5/2012 | Diner et al. | 455/69 |
| 2003/0117521 A1 * | 6/2003 | Nagaoka | 348/373 |
| 2003/0122676 A1 * | 7/2003 | Cuijpers et al. | 340/573.1 |
| 2007/0126866 A1 * | 6/2007 | Uchida | 348/79 |
| 2007/0287394 A1 * | 12/2007 | Swan et al. | 455/127.5 |
| 2009/0153687 A1 * | 6/2009 | Mayuzumi | 348/211.3 |
| 2009/0278993 A1 * | 11/2009 | Nishikawa et al. | 348/723 |
| 2011/0261182 A1 * | 10/2011 | Lee et al. | 348/77 |

* cited by examiner

*Primary Examiner* — Anthony J Daniels
(74) *Attorney, Agent, or Firm* — Shirley L. Church, Esq.

(57) ABSTRACT

A video-enabled baby monitoring system including at least two separate units, and typically at least three separate units. The first unit is a transmitter with a camera feature which captures motion and includes microprocessors which generate a series of video signal codes which are transmitted at specific radio frequencies to a dedicated receiver unit. The transmitter unit also includes an infrared light source and a sound capture source, where the sound capture source generates sound signal codes. The second unit is a receiver unit with a display screen, a video-off button and frequently a total power off button. A third unit which provides for enhanced, convenient data transfer from the transmitter unit may be selected from a number of adaptor docking stations; or a smart phone platform; or a docking cradle with Wi Fi capability.

11 Claims, 1 Drawing Sheet

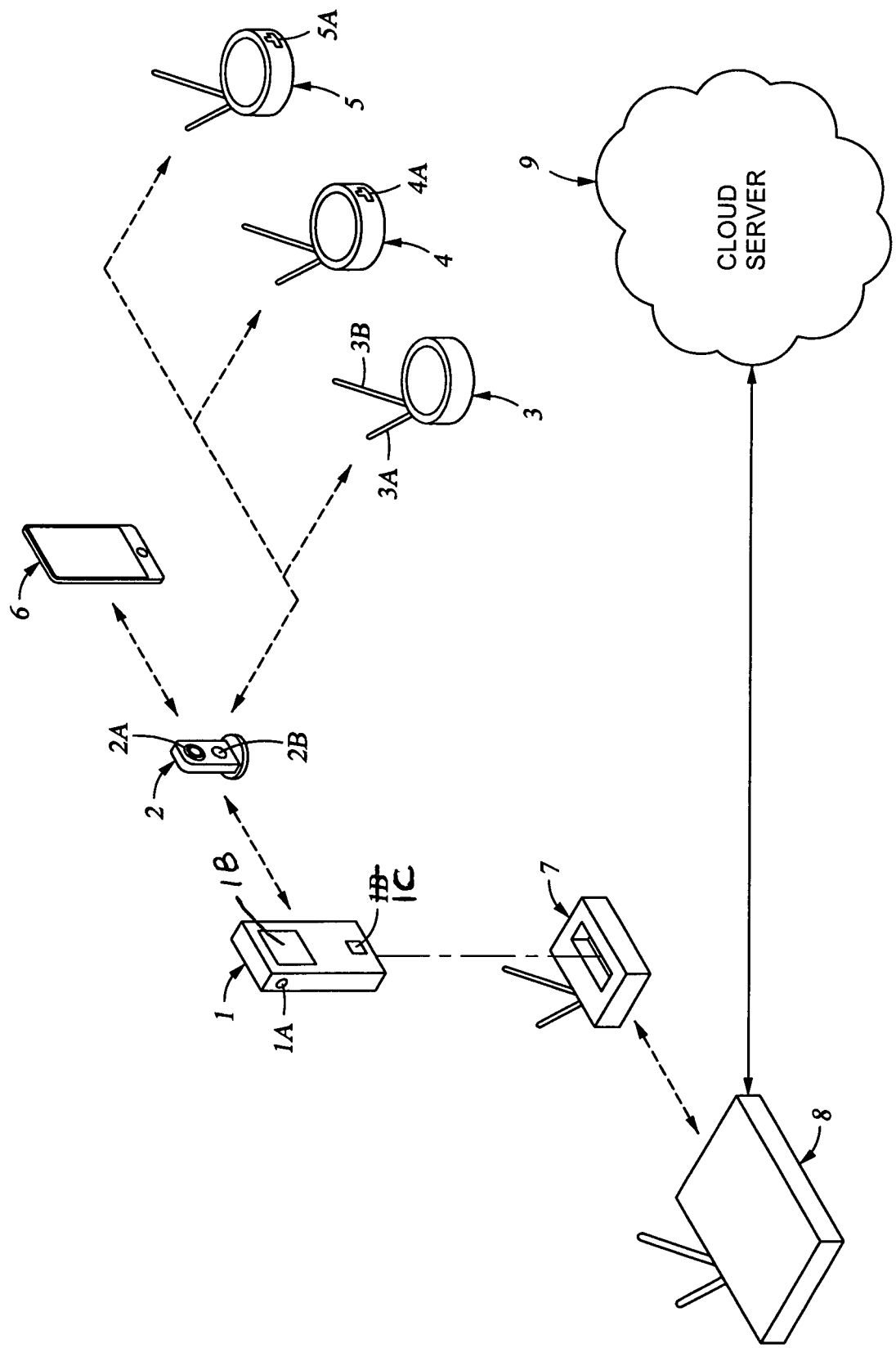

BABY MONITORING SYSTEM INCLUDING VIDEO ENHANCEMENT CAPABILITY OPERABLE AT VARIOUS FREQUENCIES

BACKGROUND OF THE INVENTION

1. Field of the Invention

The present invention relates to a video-enabled baby monitoring system which can transmit information to a variety of platforms, including, for example, intranet, internet, telephone line, and smart phone.

2. Description of the Background Art

This section describes background subject matter related to the disclosed embodiments of the present invention. There is no intention, either express or implied, that the background art discussed in this section legally constitutes prior art.

The development of wireless technology has made possible the transfer of various kinds of data rapidly, including high resolution images. The present invention makes use of this technology in combination with numerous other technologies to provide a baby monitoring system which provides advantages over other baby monitoring systems of the kind commonly known in the art.

A method and apparatus applying digital image filtering to color filter array data is described in U.S. Pat. No. 7,570,810 to Rai et al., issued Aug. 4, 2009. The invention relates to a method and graphics controller for processing an image where color filter array (CFA) data representing an image is received from a digital image capture device into a buffer, a digital filter effect is applied to the CFA data to generate filtered CFA data representing a filtered image, and the filtered image is displayed in real time on a display.

U.S. Pat. No. 7,603,080 to Richenstein et al., issued Oct. 13, 2009, describes a multiple channel wireless communication system. The invention relates to a wireless headphone device which may include a receiver for receiving a wireless digital signal containing a plurality of digital audio streams combined with control codes according to a predetermined format. A manually operated selector switch is used to select one or more of the plurality of digital audio streams to be produced as audio for the user. A decoder is used to extract the selected audio streams from the received signal in accordance with a predetermined format and for responding to the control codes in the received signal to perform predetermined functions. A wireless headphone system may include a receiver which is responsive to a transmitted digital bitstream in which a plurality of audio input channels are combined with control data, for decoding and demultiplexing the digital bitstream. A manual selector switch may be used for selecting one or more of the audio input channels to be decoded and demultiplexed by the receiver from the transmitted encoded digital bitstream. A sound producing device is used to selectively reproduce one or more selected audio channels in accordance with the control data.

While the multiple channel wireless communication described above with reference to U.S. Pat. No. 7,603,080 relates to audio streaming, it will be apparent to one of skill in the art of digital data streaming that a similar kind of system may be used to produce a wireless digital signal containing a plurality of digital image streams as well.

U.S. Pat. No. 7,822,387 to Gross, issued Oct. 26, 2010, describes a remote monitoring process. The invention is related to a remote monitoring device which is integrated as part of a cell phone or personal digital assistant. By sharing computing resources of a communications transceiver, the cost of a monitoring device is said to be significantly reduced, while still permitting sufficient functionality to effectively observe an area of interest, such as a child's sleeping area. An alert is generated and transmitted to an observer using a separate transceiver when activity at the monitored area meets a specified threshold. The activity may be related to sound or video.

A child monitor system with content data storage is described in U.S. Pat. No. 7,973,665 to Desrosiers which issued Jul. 5, 2011. The invention relates to a child monitor system which includes a child unit having a sensor to capture content, and a parent unit having a processor and a user interface communicatively coupled with the processor to reproduce the content captured by the sensor. The child unit and the parent unit are said to be configured to communicate via a wireless communication link carrying content data representative of the captured content. The system further includes a memory communicatively coupled with the child unit or the parent unit and configured for non-volatile storage of the content data.

A method, system, and computer program product for managing controlled residential or non-residential environments is described in U.S. Pat. No. 8,116,889 to Krzyzanowski et al., issued Feb. 14, 2012. The invention relates to a control server, or similar central processor which manages the distribution of data (including audio and video), voice, and control signals among a plurality of devices connected via a wired and/or wireless communications network. The devices include audio/visual devices, such as televisions, monitors, PDA's, notepads, notebooks, MP3, portable stereo, and other similar devices known in the art. The devices may be household appliances, such as lighting, ovens, and alarm clocks, for example. The control server supports video/audio serving, telephony, messaging, file sharing, internetworking, and security. A portable controller allows a user to access and control the network devices from any location within a controlled residential and/or non-residential environment, including its surrounding areas. The controllers are enhanced to support location-awareness and user-awareness functionality.

A system of managing communication network capacity is described in U.S. Pat. No. 8,135,388 to Gailloux et al., issued on Mar. 13, 2012. The invention relates to a system for managing communication network capacity, where the system includes a processor, a data store, an analysis component, and a message component. The data store stores information associated with communication metrics for customers. The analysis component, when executed by the processor, determines a mean and standard deviation for the communication metrics based on the stored information. The analysis component also determines whether the stored information associated with communication metrics for one of the customers is a predefined number of the standard deviation from the mean for more than a predefined number of days. The message component, when executed by the processor, sends a message to one of the customers in response to a determination that stored information associated with the communication metrics for one of the customers is the predefined number of the standard deviation from the mean for more than the predefined number of days. This system is designed to determine excessive usage, which is used to help determine whether customers may need a different service plan for a digital communications company, and to determine message priority within a large system, for example.

A system and method for management of a shared frequency band is described in U.S. Pat. No. 8,175,539, to Diner et al., issued May 8, 2012. The invention relates to a system, method, software and related functions for managing activity in a radio frequency band that is shared, both in frequency and time, by signals of multiple types. Signals occurring in a frequency band are detected by sampling part or the entire frequency band for time intervals. Signal pulse energy in the band is detected and is used to classify signals according to signal type. Using knowledge of the types of signals occurring in the frequency band and other spectrum activity related statistics (referred to as spectrum intelligence), actions can be taken in a device network or network of devices to avoid interfering with other signals, and in general optimize simultaneous use of the frequency band with the other signals. The spectrum intelligence may be used to suggest actions to a device user or network administrator, or to automatically invoke actions in a device or network of devices to maintain desirable performance.

The references discussed above are only a very small portion of the references which exist in the art. Applicant is providing these references because the kind of technology described in these references could be used in combination with other technology to implement portions of the elements which make up applicant's invention. Applicant hereby incorporates by reference the subject matter of all of the references discussed above, so that it is clear that applicant's description is fully enabling.

SUMMARY OF THE INVENTION

The invention relates to a video enabled baby monitoring system that typically comprises 3 separate units. Two units are present in all systems, where the first unit is a transmitter unit comprising a camera function which captures motion and which includes microprocessors which generate a series of video signal codes which are transmitted at specific radio frequencies to a dedicated receiver unit. The second unit is the dedicated receiver unit which has a display screen, typically an LCD screen or a TFT-LCD screen which displays the transmitted image and produces accompanying sound. A third unit may be an adaptor docking station which may be connected mechanically and/or electronically with the transmitter unit; the docking station typically contains features which provide enhancement of a video and audio signal received from the transmitter. The docking units may include the capability to send out signals by wireless, telephone line or LAN line techniques known in the art.

In an alternative, the third unit may be a smart phone platform, which receives the video and audio signals from the transmitter and which has an operating system selected from iOS, Android, Windows OS, and Blackberry OS, for example and not by way of limitation.

In another alternative, the third unit may be a receiver docketing cradle with WiFi capability which enables transfer of data from the receiver to a local storage server directly or to a distant storage server through a router.

The baby monitoring system may be a single integrated structure containing up to the three units, or may comprise a combination of separate units in a docking system. The baby monitoring system may also comprise multiple integrated units and may make use of various frequency transmissions.

The primary function of the transmitter unit, illustrated as unit 2 in sole FIG. 1, is the capture of motion images, which is accomplished via a camera function 2A, where the motion images are encrypted into certain video codec(s) through a microprocessor (not shown) and then to transmit the video codecs through a wireless baseband to a receiving unit, illustrated as unit 1 in FIG. 1. A microprocessor in the receiver unit 1 will decode the codecs received from the transmitter unit 2 and provide a display on a LCD, TFT-LCD, or other active matrix screen, for example. Another function of the transmitter unit 2 is to detect and capture sound data (not shown as a numbered feature in FIG. 1). The sound data is present in the area from which the video images are captured, and is processed in a manner similar to that described with respect to the video data. Video coordinated sound may be provided to receiver unit 1 and to various other receiving devices shown as units 3-6 in FIG. 1, for example. Audio data from the sound capture element may also be provided to an independent sound generator when the video feature of transmitter unit 2 is turned off. The transmitter unit 2 also includes an infrared light source which will automatically turn on when there is inadequate light to permit the camera to capture a motion image of an acceptable quality.

The transmitter unit 2 may be capable of transmitting information directly to a smart phone shown as element 6 in FIG. 1; or may be physically and/or electronically mated with a docking system illustrated as elements 3, 4, or 5, which may be used to transmit information to another device which is capable of producing sound and image information. In an alternative, the receiver unit 1 may be physically and/or electronically mated to a docking cradle shown as element 7, with WiFi capability which enables transfer of data from the receiver to a local storage server (not shown) directly or to a distant storage server shown as element 9, through a router shown as element 8.

The primary function of the receiver unit 1 illustrated in FIG. 1 is to allow video transmitted codes received from a transmitter unit, illustrated as element 2, to be displayed on a screen 1B, such as an LCD screen, TFT-LCD screen, or an active matrix display, for example. In addition the receiver unit 1 receives transmitted audio signals from the transmitter 2 and generates sound. An additional feature of the receiver 1 which is highly desirable and unique is a video-off button, illustrated in the FIG. 1 as switch element 1A, which may be used to simultaneously turn off the display screen on receiver 1 and an infrared light transmission source 2B generated by the transmitter 2. Other functions of the receiver 1, such as the reception of audio codes from the transmitter 2 and generation of audio output remain operable when the video-off button 1A is activated. An optional feature is illustrated as switch 1B, which may be used to turn off both the audio and video output functions of transmitter unit 2, if desired to conserve power. When the video-off feature is not operating, the infrared light 2B turns on and off automatically with a time out function which is being dictated by software programming based on the availability of light in the area in which an image is to be captured. The video-off button 1A provides improved energy efficiency and reduces the time duration of exposure to the frequencies released from the infrared light.

BRIEF DESCRIPTION OF THE DRAWINGS

So that the manner in which the exemplary embodiments of the present invention are attained is clear and can be understood in detail, with reference to the particular description provided above, and with reference to the detailed description of exemplary embodiments, applicants have provided an illustrating drawing. It is to be appreciated that the drawing is provided only to assist in understanding of the invention, and that certain well known processes and apparatus are not illustrated herein in order not to obscure the inventive nature of the subject matter of the disclosure.

The drawing is a single FIG. 1, which illustrates the general concept of devices employed to carry out functions which are described for the invention. An operating system comprises at least 2 separate elements. These two elements include a receiver unit 1, and a transmitter unit 2. Typically there is a third unit, such as at least one docketing unit selected from units 3, 4, 5, and 7, for example; or a smart phone 6. A transmitter unit 2 includes a camera feature 2A, an infrared light source 2B, and a sound capture capability (not shown).

A receiver unit 1 includes a display screen 1B, a video-off button (switch) 1A, and optionally, a total on-off switch 1C. A docking unit 3 may include at least one of a variety of transmitter docking units, 3, 4, and 5; or a smart phone 6, which may receive transmissions directly from the transmitter unit 2. Docking unit 3 typically includes antennae 3A and 3B which may be used for transmission through a WiFi unit which is capable of communicating with a variety of smart phone platforms, computer system, or tablet devices. Docking unit 4 includes a WiFi transmission unit and a LAN plug 4A which may be used in combination with a local area network which is in communication with the internet, a general computer system, or a tablet device. Docking unit 5 includes a WiFi transmission unit and a telephone jack 5A which may be used in combination with a phone line which is in communication with the internet or which may communicate with any of a multiple of smart phone platforms. Also shown in the single FIG. 1 is a receiver docking unit 7 with WiFi capability which may be used directly in combination with local devices or which may be used remotely through a router 8 to connect to remote storage devices 9.

DESCRIPTION OF EMBODIMENTS

The invention relates to a video and audio enabled baby monitoring system that frequently comprises a combination of three specifically functional units. A transmitter unit is used to capture motion, and periodically makes use of an infrared light source to provide adequate imaging. The transmitter unit also includes a sound capturing device, where the motion capture device and the sound capturing device, through microprocessors and compression methods, generate a series of dedicated signal codes which can be transmitted through a specific radio frequency to a dedicated receiving device. A receiving unit (device) typically includes an LCD (liquid crystal display) or a TFT-LCD display, and which may alternatively include an active matrix display. The receiving unit also includes a video-off button (switch) and may include a total on-off button (switch). The third unit, which is typically present, is an adaptor docking station that can be connected mechanically and/or electronically with the transmitter unit, where the adaptor docking system has the capability to enhance video signal transmission through intranet, internet, and telephone line. In an alternative embodiment, which does not require a docking station, the transmitter may work in conjunction with various smart phone platforms, which have an operating system selected from iOS, Android, Windows OS, and Blackberry OS, for example and not by way of limitation. In another alternative embodiment, the receiver may be docked in a cradle, where the cradle is in communication with a router which may be used for local and remote communications.

With reference to the sole FIG. 1, the primary function of the receiver unit 1 including a display screen 1B, such as an LCD screen or TFT-LCD screen, or active matrix screen, is to allow video transmitted codes received from a transmitter unit 2 to be displayed on the display screen. A unique feature of the receiver unit 1 is that by pushing a video-off button 1A, the display screen is turned off, and when this manual turn off feature is implemented, an infrared light source 2B on the transmitter unit 2 is also turned off, and will not reactivate until the video-off button on the receiver unit 1 is turned on.

When the video-off button 1A on receiver unit 1 is turned on, the infrared light source on transmitter unit 2 will automatically turn on when there is inadequate light to permit the camera to capture a motion image of an acceptable quality, and will automatically turn off when there is adequate light to permit the camera elements 2A to capture a motion image of acceptable quality. Motion images are captured and transmitted through an encoded video codec through a wireless base band to the receiver unit 1. The receiver unit 1 will decode and display the video image on the display screen. When the screen is turned off, only an audio signal is transmitted from transmitter unit 2, and there is no motion image. Another function of the receiver unit 1 is to decode the audio codes and to play out the sounds which accompany the video. Audio signals are simultaneously encoded and decoded with video codecs when the display is turned on. Audio signals are individually encoded and decoded when the display is turned off.

A particularly advantageous feature of the invention is the inclusion on receiver unit 1 of the video-off button 1A, which permits the user to not only turn off the display screen 1B, but to simultaneously turn off the infrared light source 2B present on the remotely-located transmitter unit 2, which is used in combination with the receiver unit 1. This provides improved energy efficiency and reduces the time duration of released frequencies from the infrared light.

The primary function of the transmitter unit including a camera lens, which is illustrated as element 2 in the FIGURE, is to capture video images, and through microprocessors then generate a series of codes and to turn these codes into motion pictures and display in a receiver unit 1. Other functions of the transmitter unit are to detect and capture audio data present in the area from which the video images are captured, and to similarly generate a series of codes which may be converted to sound which accompanies the video display provided at the receiver unit 1.

The transmitter unit shown as element 2 in the FIGURE may be physically and electronically mated with a docking system which is used to transmit video and audio data to a smart phone or other device capable of displaying the information.

The transmitter shown as element 2 comprises an infrared light 2A which will automatically turn on when there are not enough light sources being detected, so that video images may be created. However, as previously discussed the infrared light can be manually turned off by pressing a video-off button, such as button 1A on the receiver unit 1.

A first embodiment of a docking station for the transmitter is shown as element 3 in the FIGURE. The docking station may be physically and electronically mated with the transmitter unit of the kind shown as element 2 of the FIGURE. The antennae 3A and 3B of the docking station shown as element 3 are used for transmission through a WiFi network which may be connected to various display platforms.

A second embodiment of a docking station that physically and electronically mates with the transmitter unit is illustrated as element 4 in the FIGURE. The docking unit illustrated as element 4 may be used for transmission through a WiFi network, or in the alternative, a LAN plug 4A may be used to integrate connection through a local area network to internet. The internet transmission may be sent to multiple smart phone platforms, for example and not by way of limitation.

A third embodiment of a docking station that physically and electronically mates with the transmitter unit with camera lens is illustrated as element 5 in the FIGURE. The docking unit illustrated in element 5 may be used for transmission through a WiFi network, or in the alternative, a telephone jack 5A may be used to transmit information through a phone line and to connect to multiple smart phone platforms thereby.

Element 6 in the FIGURE illustrates a communication embodiment where the transmitter 2 is capable of communicating directly with a smart phone commonly available in the market. Such a smart phone may include any one of a number of operating systems such as iOS, Android, Windows OS, or Blackberry OS by way of example and not by way of limitation.

Element 7 in the FIGURE shows a docking cradle which may be used in combination with the receiver unit 1. The docketing cradle of element 7 may be used for WiFi transmission to a router 8 which directs the transmission to a local data storage unit (not shown) or to a remote storage unit 9.

The above described exemplary embodiments are not intended to limit the scope of the present invention, as one skilled in the art can, in view of the present disclosure, expand such embodiments to correspond with the subject matter of the invention claimed below.

I claim:

1. A video-enabled baby monitoring system which includes at least two separate units comprising:
    a transmitter unit including a camera feature which captures motion, a sound sensor which captures sound, and an infrared light source capable of providing sufficient light for imaging when necessary, wherein said transmitter unit also includes microprocessors which generate a series of video signal codes and audio signal codes which are transmitted at a specific radio frequency to a dedicated receiver unit; and
    a receiver unit including a display screen, where said receiver unit receives said signal codes from said transmitter and provides a displayed image, in combination with corresponding sound, or provides the sound alone, wherein said receiver unit includes a video-off button which enables a user to simultaneously turn off said display screen, and to turn off said camera feature, and said infrared light source of said transmitter remotely, whereby sound is transmitted to said receiver without video.

2. A video-enabled baby monitoring system in accordance with claim 1, wherein said receiver unit display screen is selected from the group consisting of an LCD screen, a TFT-LCD screen, an active matrix screen, and combinations thereof.

3. A video-enabled baby monitoring system in accordance with claim 1, including an adaptor docking station which may be connected mechanically and electronically, or only electronically with said transmitter unit and which contains features which provide enhancement of a video signal, an audio signal, or a combination thereof received from said transmitter, and wherein said adaptor docking station enables signals sent to said docking station to be further transmitted through a device selected from the group consisting of a networking device, a LAN plug, a telephone jack, and combinations thereof.

4. A video-enabled baby monitoring system in accordance with claim 3, wherein said adaptor docking station enables said signals to be transmitted through a WiFi network.

5. A video-enabled baby monitoring system in accordance with claim 3, wherein said adaptor docking station enables said signals to be transmitted through a LAN plug.

6. A video-enabled baby monitoring system in accordance with claim 3, wherein said adaptor docking station enables signals to be transmitted through a WiFi or a LAN plug.

7. A video-enabled baby monitoring system in accordance with claim 3, wherein said adaptor docking station enables signals to be transmitted through a WiFi networking device or a telephone jack.

8. A video-enabled baby monitoring system which includes at least two separate units comprising:
    a transmitter unit with a camera function which captures motion and a sound sensor which captures sound, and an infrared light source capable of providing light for imaging when necessary, wherein said transmitter unit includes microprocessors which generate a series of video signal codes and audio codes which are transmitted at specific radio frequencies to a dedicated receiving device; and
    a receiver unit with a display screen selected from the group consisting of an LCD screen, a TFT-LCD screen, an active matrix screen, and combinations thereof, where said receiver unit receives said signal codes from said transmitter and displays an image on said display screen and produces sound from a sound system, wherein said receiver unit includes a video-off button which enables a user to simultaneously turn off said display screen of said receiver, and to turn off said camera function, and said infrared light source of said transmitter remotely, whereby sound is transmitted to said receiver without video, and wherein said receiver unit is a smart phone platform capable of accepting transmissions from said transmitter unit.

9. A video-enabled baby monitoring system in accordance with claim 8, wherein said smart phone platform makes use of an operating system selected from the group consisting of iOS, Android, Windows OS, and Blackberry OS.

10. A video-enabled monitoring system which includes at least three separate units, comprising:
    a transmitter unit including a camera lens which captures motion and a sound sensor which captures sound, and an infrared light source capable of providing light for imaging when necessary, wherein said transmitter unit includes microprocessors which generate a series of video signal codes and audio signal codes which are transmitted at a specific radio frequency to a dedicated receiver unit;
    a receiver unit including a display screen selected from the group consisting of an LCD screen, a TFT-LCD screen, and an active matrix screen, and combinations thereof, where said receiver unit receives said signal codes from said transmitter and displays an image on said display screen and produces sound from a sound system; and
    an adaptor docking cradle which may be connected mechanically and electronically, or only electronically with said receiver unit, wherein said docking cradle has a networking capability, and wherein said receiver unit includes a video-off button which enables a user to simultaneously turn off said display screen of said receiver, and to turn off said camera function, and said infrared light source of said transmitter remotely, whereby sound is transmitted to said receiver and said docking cradle without video.

11. A video-enabled monitoring systems in accordance with claim 10, wherein said docking cradle is in communication with a router which is in connection with a network selected from a local network, the interne, and combinations thereof.

* * * * *